United States Patent
Alwan et al.

(10) Patent No.: US 7,203,424 B2
(45) Date of Patent: Apr. 10, 2007

(54) AUTOMATIC LASER POWER CONTROL IN AN OPTICAL COMMUNICATION SYSTEM

(75) Inventors: James J. Alwan, Ramona, CA (US); Victor Jim Chan, San Diego, CA (US); Scott Harris Bloom, Encinitas, CA (US); Glenn Claude Hoiseth, Temecula, CA (US); Scott Platenberg, Encinitas, CA (US); Raymond Dennis Rogers, San Diego, CA (US)

(73) Assignee: Kiribati Wireless Ventures LLC, Las Vegas, NV (US)

( * ) Notice: Subject to any disclaimer, the term of this patent is extended or adjusted under 35 U.S.C. 154(b) by 856 days.

(21) Appl. No.: 09/941,319

(22) Filed: Aug. 28, 2001

(65) Prior Publication Data

US 2002/0089727 A1    Jul. 11, 2002

Related U.S. Application Data

(60) Provisional application No. 60/240,346, filed on Oct. 13, 2000.

(51) Int. Cl.
*H04B 10/00* (2006.01)
(52) U.S. Cl. ..................... 398/120; 398/123; 398/124

(58) Field of Classification Search ............... 398/118, 398/120–121, 123–124, 128–131
See application file for complete search history.

(56) References Cited

U.S. PATENT DOCUMENTS

| | | | |
|---|---|---|---|
| 5,229,593 A * | 7/1993 | Cato | 250/205 |
| 5,451,765 A | 9/1995 | Gerber | |
| 5,786,923 A | 7/1998 | Doucet et al. | |
| 5,837,996 A | 11/1998 | Keydar | |
| 6,016,313 A | 1/2000 | Foster, Jr. et al. | |
| 6,049,593 A | 4/2000 | Acampora | |
| 6,594,043 B1 * | 7/2003 | Bloom et al. | 250/205 |
| 6,643,466 B1 * | 11/2003 | Helms et al. | 398/120 |
| 6,775,480 B1 * | 8/2004 | Goodwill | 398/158 |

* cited by examiner

*Primary Examiner*—Dzung Tran

(57) ABSTRACT

A system and method for use with an optical communication beam of light is disclosed. The system allows the beam of light to operate at an adequate power level that provides a robust optical link while minimizing any safety risk to humans. Such a system includes multiple operating modes which control the power output of the beam of light. In the normal mode, the beam of light operates at a selected power level which provides a desired signal to noise ratio. Once a blocking occurs, the beam of light enters a power reduction mode to prevent harm to the blocking object. An acquisition and recovery mode is then employed to reestablish the blocked communication link.

43 Claims, 8 Drawing Sheets

AUTOMATIC LASER POWER CONTROL IN AN OPTICAL COMMUNICATION SYSTEM

RELATED APPLICATION

This application claims priority to provisional application serial No. 60/240,346, filed Oct. 13, 2000, entitled "Automatic Control of Laser Power in Free-Space Optical Links" which is hereby incorporated by reference.

BACKGROUND OF THE INVENTION

1. Field of the Invention

The present invention relates to systems and methods for free-space optical communication networks and to a system and method for controlling the power of a laser used in such a network.

2. Description of the Related Technology

Currently, the primary method for data transmission between remote locations utilizes wired lines or fiber optic cables. Some of the costs associated with this method are due to the expense in obtaining rights-of-way for the cable runs as well as installing the cables by burying or hanging. While this method has proven successful where great distances separate two locations, it is prohibitively expensive between locations that are within close proximity to one another.

The dramatic growth in the demand for broadband services and the time and expense associated with deploying traditional wired lines or fiber optic cables have led to the development of new wireless broadband access technologies. One of these new wireless technologies employs a Light Amplification Stimulated Emission of Radiation (laser) beam to transmit information. Such a system may consist of at least 2 optical transceivers accurately aligned to each other with a clear line-of-sight to deliver the information using such a laser beam.

However, when the communication laser beams are present in a location accessible by people, laser safety becomes an important issue. Unlike light produced by a common lamp or the sun, laser light is not divergent and often emits radiation within a narrow band of wavelengths to form a monochromatic light. Furthermore, because this laser light is coherent and non-divergent, it is easily focused by the lens of a human eye to produce images on the retina with greater intensity than is possible with these other common sources of light.

Safety guidelines do exist for the use of lasers. For example, such guidelines are promulgated by the International Electrotechnical Commission (IEC) based on a maximum permissible exposure (MPE) level. If one were to apply such a standard, a maximum power level could be predicted (known as an Accessible Emission Limit (AEL)) that would make the communication laser beam eye-safe to a viewer, known as a class 1 laser system in the IEC standard. However, to establish and maintain a high-bandwidth connection, the lasers used in such systems may transmit at power levels that exceed the class 1-power levels designated by these laser safety guidelines.

Therefore, there is a need for a system and a method that allows the use of optical communication beams of light with adequate power to provide a robust optical link between communication terminals while minimizing safety risks to either users or a passerby. Such a system and method may maintain a signal-to-noise ratio above a desired value at the distant receiving communication terminal and under various environmental conditions that tend to degrade the signal, such as fog, smog, rain, or snow. Moreover, such a system and method could expand the permissible locations for placement of such optical transceivers to places that are accessible to humans.

SUMMARY OF THE EMBODIMENTS

The systems and methods have several features, no single one of which is solely responsible for its desirable attributes. Without limiting the scope as expressed by the claims which follow, its more prominent features will now be discussed briefly. After considering this discussion, and particularly after reading the section entitled "Detailed Description of the Preferred Embodiments" one will understand how the features of the system and methods provide several advantages over traditional communication systems.

One aspect is a method for controlling laser power in a communication system which includes a first node and a second node. The first node transmits a first beam to the second node and the second node transmits a second beam to the first node and the first and second beams maintain a safe exposure level to a blocking object. The method comprises maintaining power of a first beam transmitted by a first node to the second node at a first level when the power of the second beam transmitted by the second node and received by the first node is above a minimum value. The method further comprises reducing the power of the first beam to a second level when power from the second beam falls below the minimum value to limit an object's radiation exposure to a safe level when the object blocks the first beam. The power of the first beam is pulsed to limit the radiation exposure of the blocking object to the safe level. The method further comprises transmitting information during the pulsing of the first beam to reestablish communication with the second node. Finally, the power of the first beam is increased to the first level.

Another aspect is a system configured for controlling laser power in a communication system which includes a first node and a second node. The first node transmits a first beam to the second node and the second node transmits a second beam to the first node and the first and second beams maintain a safe exposure level to a blocking object. The system comprises a first node having a first transceiver configured to transmit a first beam at a first power level and configured to receive a second beam, a second node having a second transceiver configured to transmit the second beam at a second power level to the first transceiver and configured to receive the first beam transmitted by the first transceiver. The system further comprises a first control module configured to control the first transceiver to maintain a safe exposure level to a blocking object by changing the first power level of the first beam based on the power level of the received second beam. The system still further comprises a second control module configured to control the second transceiver to maintain the safe exposure to the blocking object by changing the second power level of the second beam based on the power level of the received first beam.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE PREFERRED EMBODIMENTS

A free-space communication network may consist of at least two pairs of optical receivers and transmitters accurately aligned with each other with a clear line-of-sight to deliver high-bandwidth access over the air using beams of optical radiation, commonly called light. The light's wavelength is a function of a selected laser medium. Such laser mediums include, for example, solids, gases or liquids. The wavelengths form a continuous range but are often broken into specific regions, for example, infrared radiation (800 nanometer–3 millimeters), visible light (400 nm–700 nm), ultraviolet radiation (300 nm–3 nm), x-rays and gamma rays (<3 nm). In one embodiment, the optical receiver and transmitter are combined into an optical transceiver. Each optical transceiver can include at least one Light Amplification Stimulated Emission of Radiation (laser) and an optical detector. Embedded within the beams of radiation from the transmitter is information, for example, in the form of data, voice, and video. The corresponding receiver, which has an optical detector and associated signal processing circuit may convert the information into an electrical signal for further routing or processing.

Figure 1:
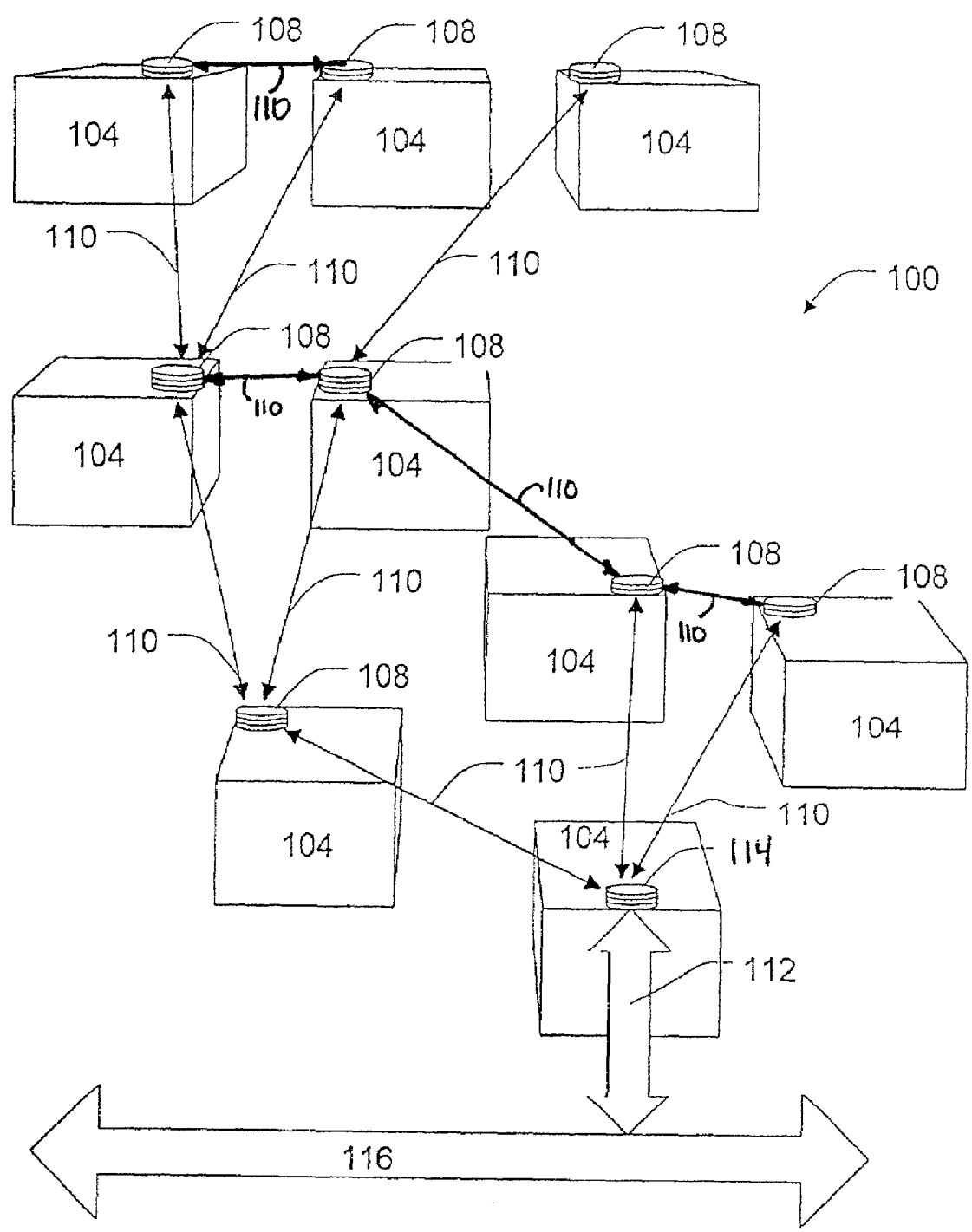
FIG. 1 is a diagram illustrating an example communication network.

FIG. 1 is a diagram illustrating an exemplary communication network 100. The communication network 100 includes a plurality of nodes 108, interconnected by communication links 110. Each communication link 110 includes two opposing beams of radiation between two nodes (i.e. incoming and outgoing beams). Certain of the communication links 110 may be radio links or microwave links under appropriate circumstances. According to one embodiment, the nodes 108 are disposed on facilities 104. Although only one node 108 is provided per facility in the example illustrated in FIG. 1, more than one node 108 can be provided at one or more of facilities 104, depending on the communication requirements, and also, perhaps, depending on the particular facility. Facilities 104 can be buildings, towers, or other structures, premises, or locations.

Nodes 108 are interconnected with one another by optical communication links 110. Nodes 108 include one or more optical transmitters and receivers to provide the communication links 110 among the plurality of nodes 108. The transmitters and receivers at nodes 108 can be implemented using, for example, lasers or light emitting diodes (LEDs) as the optical transmitters and charge-coupled devices (CCDs), photomultiplier tubes (PMTs), photodiode detectors (PDDs) or other photodetectors as the receivers. Although the network 100 illustrated in FIG. 1 is illustrated as a mesh network structure, other network structures or geometries can be implemented. For example, in one embodiment, a branching tree architecture is used. In one embodiment, the nodes 108 include the capability to interface with up to four separate communication links 110.

Still referring to FIG. 1, network 100 provides a two-way connection between one or more users in one or more facilities 104 and with a provider network 116 via a root node 114. The root node 114 connects with the provider network 116 via another communication link 112. In one embodiment, the provider network 116 is a high bandwidth copper or fiber service provider. Although only one provider network 116 is illustrated in FIG. 1, one or more root nodes 114 can be used to interface to more than one provider network 116.

Figure 2:
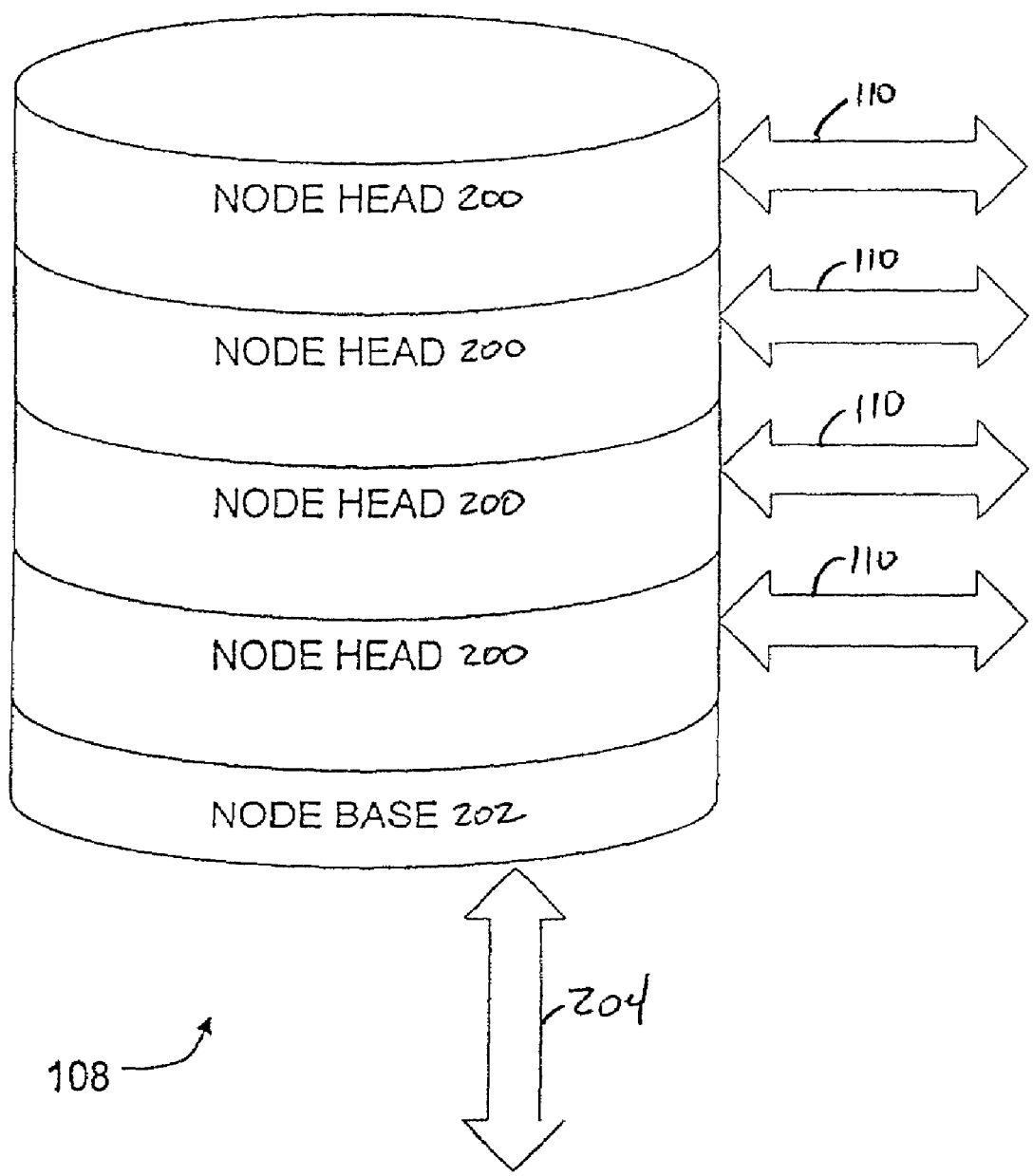
FIG. 2 is a diagram illustrating an example implementation of a node.

FIG. 2 is a diagram illustrating an example implementation of a node 108 which is generally cylindrical in shape and can include four node heads 200 and a node base 202. Node heads 200 each include a transceiver (not shown) to facilitate communication with one or more other nodes 108 in a network 100 (see FIG. 1). Each node head 200 provides a two-way communication link 110 with one other node head in the network 100 at a given time. Thus, where each node head 200 has a single transceiver, node 108 communicates with up to four other nodes 108 at four separate locations. Alternatively, two node heads can provide parallel links to a single node. Other numbers of node heads 200 can be included, depending on the fan-out capability desired for the node 108. Node 108 further includes a drop 204 for connecting to a user. In one embodiment, the drop is hardwired between the node base 202 and into a facility 104 (see FIG. 1).

Node base 202 includes electronics and mechanics to provide a communication interface between, for example, a provider network 116 and the one or more node heads 200 via a communication link 112 (see FIG. 1). A communications interface to perform protocol or format conversions can be included in the node base 202 as well as mechanics to drive the pointing of one or more node heads 200.

One embodiment of the communication network 100 uses an optical transmission and multiplexing scheme for transferring data between the nodes 108 and the provider network 112. Such schemes use a physical layer technology to handle the actual transmission and reception of data. In one embodiment, synchronous optical network (SONET) is used which the American National Standards Institute standardizes. In another embodiment, synchronous digital hierarchy (SDH) is used which the International Telecommunications Union standardizes. The basic SONET channel transmits 52 Mbps or OC-1. Higher transfer rates are obtained with the use of multiplexing. For example, a transfer rate of 155 Mbps, or OC-3, is achieved where three OC-1 channels are byte-interleaved.

Figure 3:
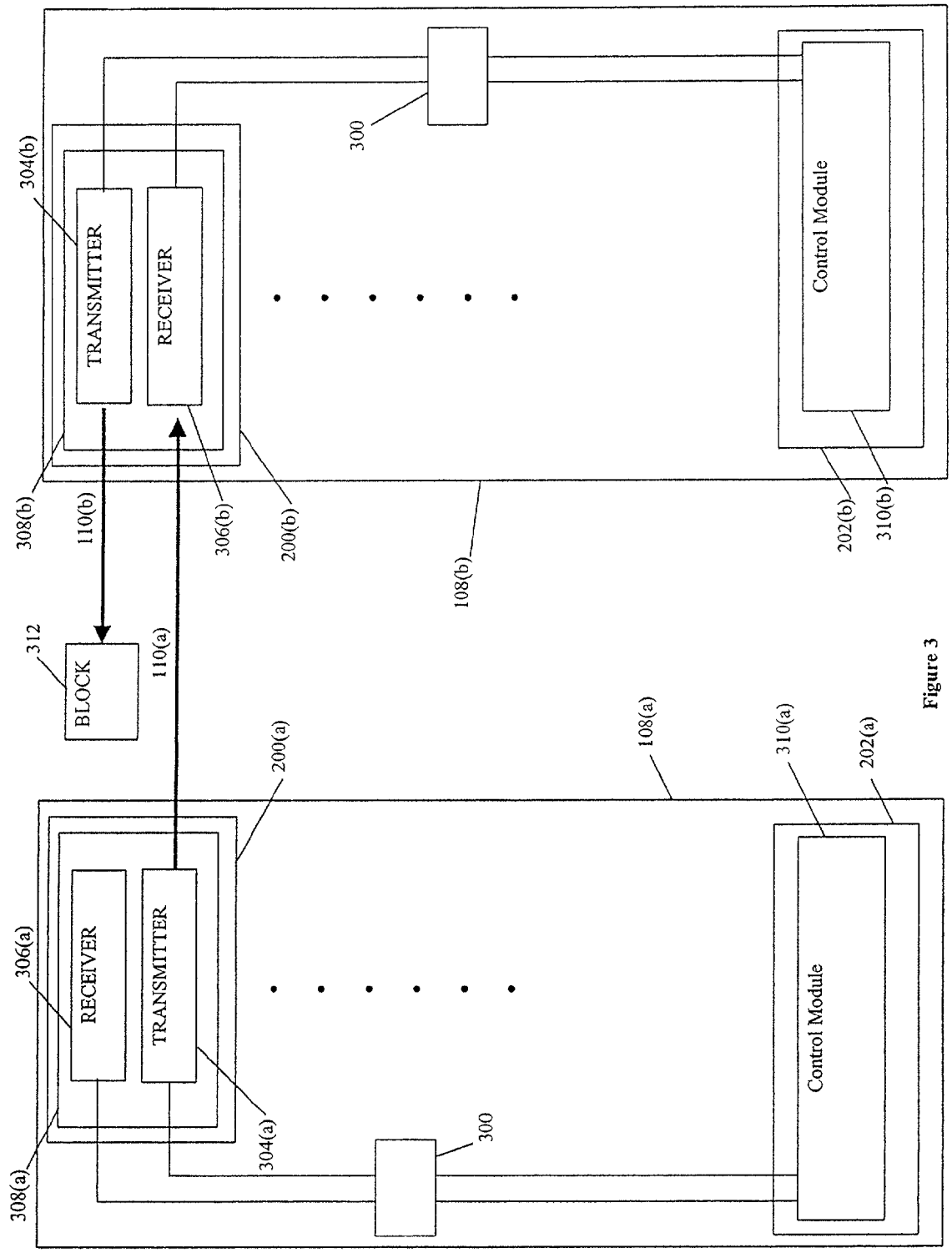
FIG. 3 is a block diagram illustrating a blocked communication link between two node heads of two nodes.

FIG. 3 is a block diagram illustrating a blocked communication link between two node heads 200(a), 200(b) of two nodes 108(a), 108(b). Node 108(a) includes a node base 202(a) coupled to at least one node head 200(a) via communication electronics 300. Node 108(b) includes a node base 202(b) coupled to at least one node 200(b) via communication electronics 300. Communication electronics 300 interface each node head 200(a), 200(b) to node base 202(a), 202(b). In one embodiment, the communication electronics 300 includes a bus which connects the node heads 200(a), 200(b) to their respective node bases 202(a), 200(b). In embodiments where each node 108(a), 108(b) includes multiple node heads, a multiplexer can be provided as part of the communication electronics 300 to allow communications among the various elements over a shared bus.

Each node head 200 can include a pointing mechanism such that it can be rotated to point to a designated other node 108. Such pointing can be performed in both azimuth and elevation. Ideally, each node head 200 can be independently pointed to a designated node 108.

Node head 200(a) includes a transmitter 304(a) and a receiver 306(a), thereby providing two-way communications. However, in alternate embodiments, the node head 200(a) has only the transmitter 304(a) or the receiver 306(a), thereby providing one-way communication. In another embodiment, the transmitter 304(a) and the receiver 306(a) are combined into a transceiver 308(a). Additionally, it is possible that node head 200(a) include more than one transceiver, or an additional receiver or transmitter to provide additional capabilities. Node head 200(b) includes a transmitter 304(b) and a receiver 306(b), thereby providing two-way communications. In one embodiment, the transmitter 304(b) and the receiver 306(b) are combined into a transceiver 308(b).

Node base 202(a) includes a control module 310(a). Similarly, node base 202(b) includes a control module 310(b). Each control module 310(a), 310(b) receives signals from the receiver 306(a), 306(b) and controls the operation of its respective transmitter 304(a), 304(b) based on the received signal. More specifically, the control module 310(a), 310(b) interrupts or reestablishes the transmission of the transmitter 304(a), 304(b). Thus, each control module 310(a), 310(b) controls its portion of the communication link with another node. The communication link is illustrated in FIG. 3 as including two communication beams 110(a), 110(b).

The term "module," as used herein, means, but is not limited to, a software or hardware component, such as a FPGA or ASIC, which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

In operation, data that is transferred from node 108(a) to node 108(b) is modulated onto the communication beam 110(a) emitted by the transmitter 304(a). Receiver 306(b) processes the received modulated signal in the communication beam 10(a) such that it can be repeated or forwarded to another node 108 in the network 100. Alternatively, the processed signal can be passed either to an end user at a facility 104 or to a provider network 116 (see FIG. 1).

As mentioned above, the transmitter 304(b) can be interrupted due to an object 312 being present in the optical communication beam 110(b). The object may be any opaque matter that sufficiently attenuates the transmitted signal to a level such that the associated data is not detectable by the receiver 306(a). In one embodiment, the object reduces the power level of the communication beam 110(b) which is detected by the receiver 306(a). For example, a bird, a baseball, smog, fog, or an airplane could block the beam of radiation. In one embodiment, the lower bound signal-to-noise ratio that defines the block is selected based on the error rate associated with the received data. In another embodiment, the block is defined based on the duration of the interruption.

Figure 4:
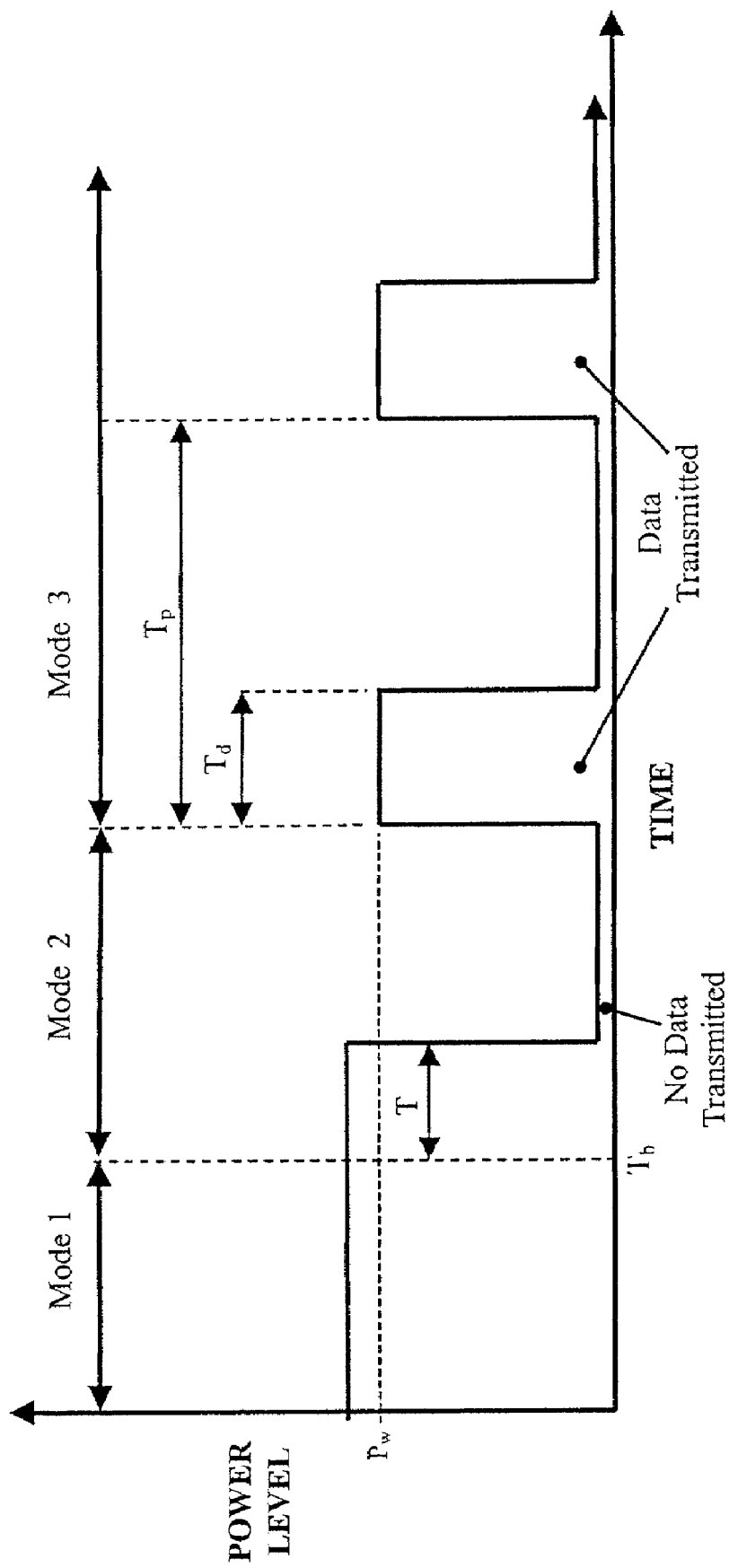
FIG. 4 is a graph of the power levels and associated durations of an interrupted beam of radiation.

FIG. 4 illustrates three different operating modes at different times that may be implemented by the control module 310(a), 310(b) depending on the status of the communication beams 110(a), 110(b). FIG. 4 depicts the average power of a communication beam over time. Referring to FIGS. 3 and 4, for example, when the communication beams 110(a), 110(b) are not blocked and are properly targeted, the control modules 310(a), 310(b) operate in a "normal operation" mode (Mode 1). In Mode 1, nodes 108(a), 108(b) modulate data on their respective communication beams 110(a), 110(b). The power levels of the communication beams 110(a), 110(b) are set to a high level to achieve desired signal-to-noise ratios at the respective receiver 306(a), 306(b), for example, 9.5 mW.

Assume, however, at a time $T_b$, the object 312 blocks one or both of the communication beams 110(a), 110(b) between the nodes 108(a), 108(b). For example, in FIG. 3, communication beam 110(b) is blocked by object 312. The power level of the communication beam 110(b) received by the receiver 306(a) suddenly drops. The control module 310(a) responds to this event by beginning the power reduction mode (Mode 2).

In the power reduction mode, the power level of the signal being transmitted by the transmitter 304(a) is immediately reduced to a low level or zero after a short period T of delay. In one embodiment, period T is 800 msec. The duration of T can be selected such that the total energy of the radiation transmitted by the transmitter 304(a) during period T is below a level that would present a safety hazard to humans. For example, if the transmitter 304(a) was transmitting at an initial power level of 9.5 mW during Mode 1, the maximum value of T is 0.85 seconds. The control module 310(a) stops sending data on communication beam 110(a). Instead, the data received by node 108(a) that would have been sent to node 108(b) can be re-routed to an alternate node 108 (not shown) via one of the other node heads.

In response to the drop in power by node 108(a), the control module 310(b) of node 108(b) can operate in a similar manner. Alternatively, the unblocked beam 110(a) can be left transmitting while a signal is sent, via a network management system (not shown), to alert node 108(b) that beam 110(b) is not being received. When the second beam is forced to fail, the control module 310(b) reduces the power of the communication beam 110(b) and stops sending data to node 108(a). Hence, blocking of a single communication beam 110(b) between two nodes 108(a), 108(b) results in an interruption and failure of the two-way communication. However, this response may have a delay since the node 108(b) is responding to the actions of node 108(a). By stopping the transmission of the unblocked beam 110(a), an immediate signal, in the form of a lack of signal, is sent to the node transmitting the blocked beam thus minimizing the complexity of notifying the blocked node and the associated delay in such notification. The value of T is selected to account for this delay so that the radiation transmitted by the transmitter 304(b) during T is also below a level that would present a safety hazard to humans.

Still referring to FIG. 4, once Mode 2 is executed and the output of the communication beam 110(b) is reduced to a safe level or shut off, the control module 310(b) begins an acquisition and recovery mode (Mode 3). Mode 3 will continue until the communication beam 110(b) is no longer blocked. As shown in FIG. 4, in one embodiment the control module 310(b) operates the transmitter 304(b) in a pulsed transmission mode by intermittently raising its power to a high level for a short pulse duration, Td, with a time interval of $T_p$. The power level during each pulse duration, $T_d$, is sufficiently high so that the signal-to-noise ratio at receiver 306(a) is acceptable for the purpose of reestablishing optical communication. In one embodiment, the power level in each pulse is the same as the power level during the normal operation mode (Mode 1). In another embodiment, the pulsed power level is at a lower level. The communication beam 110(b) is modulated during each pulse duration, $T_d$, with acquisition data for establishing optical communication and is not modulated to carry data between pulses. The acquisition data may include, for example, a node ID, position, and orientation information. In another embodiment, the communication beam 110(b) sends out other data along with the acquisition data during the pulse duration. In still another embodiment, the control module 310(b) alternates between the acquisition data and other data between each pulse duration. The pulse duration $T_d$ and the period $T_p$ are selected so that the total radiation is below a level that would present an unacceptable hazard to humans. Thus, during mode 3, the object 312 is not exposed to a radiation level that would present a hazard to humans.

Figure 5:
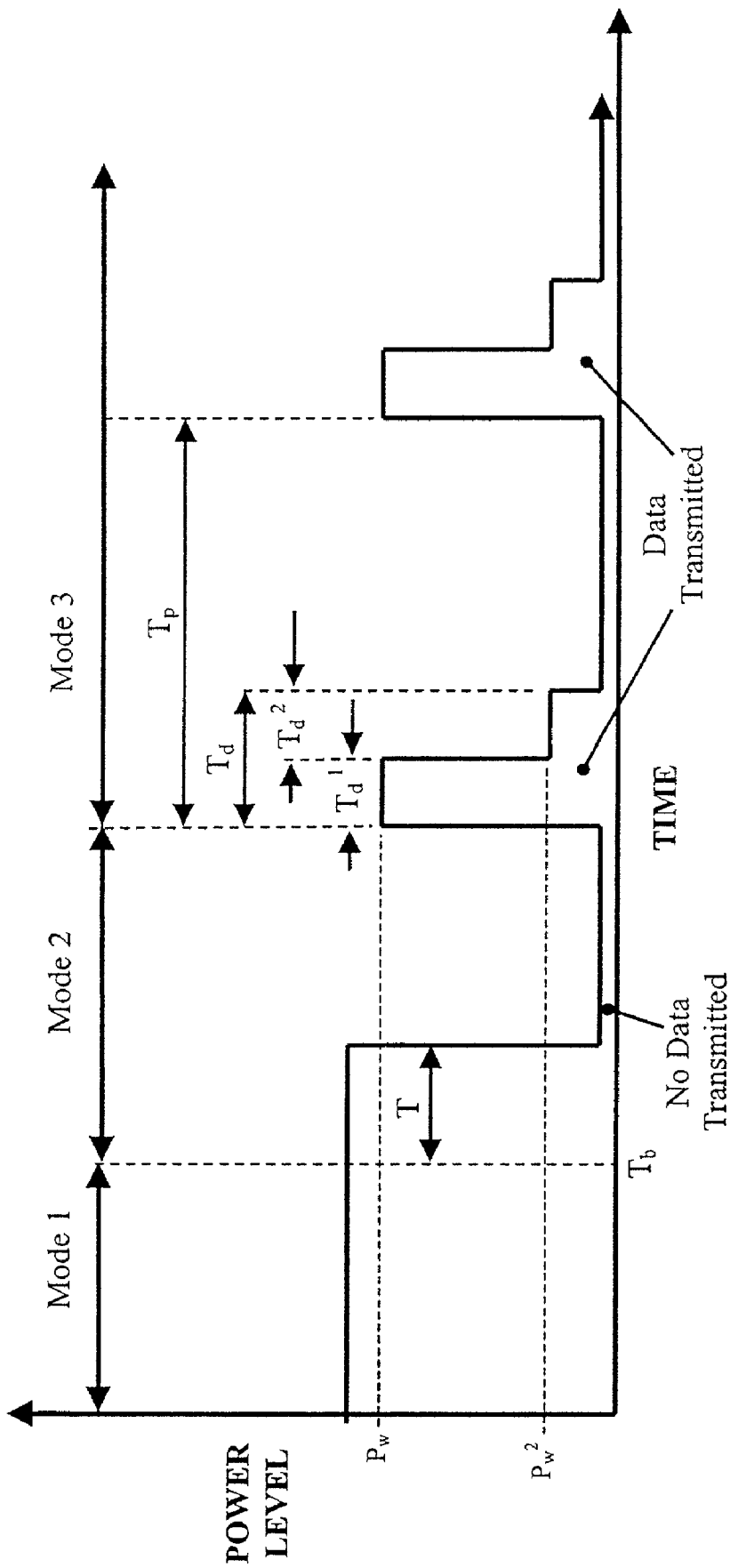
FIG. 5 is a graph of the power levels and associated durations of an interrupted beam of radiation.

FIG. 5 is a graph of the power levels of an interrupted communication beam over time. FIG. 5 depicts an embodiment where Mode 3 includes at least two different power levels, $T_d$ and $T_d^2$. Using different power levels can improve reestablishing optimal communication between nodes 108(a), 108(b) even during adverse weather conditions. For example, on a clear day when visibility is good and the communication beam 110(b) is not blocked, the transmitter 304(b) operates at a high power level, $T_d^1$. However, such a high power level may saturate receiver 306(a). To prevent this, the transmitter 304(b) transmits at a lower power level during $T_d^2$ so that the receiver 306(a) will properly detect the communication beam 110(b) and be able to extract the transmitted data. Conversely, the communication beam 110(b) transmitted at the low power level, $T_d^2$, may be too weak on a foggy day to achieve a desired signal-to-noise ratio at the receiver 306(a). By transmitting at the high power level during $T_d^1$ the receiver 306(a) will properly detect the communication beam 110(b) and be able to extract the transmitted data. Thus, this pulse structure allows two communicating nodes 108(a), 108(b) to reestablish optical communication at local environmental and weather conditions throughout the year.

Still referring to FIG. 5, in one embodiment, the pulse durations $T_d^1$ and $T_d^2$ are of equal duration and last for $T_d/2$. In another embodiment, both the high and low power levels, $T_d^1$ and $T_d^2$, are sufficiently high for communicating data to node 108(a). In still another embodiment, $T_d^1$ and $T_d^2$ are modulated to carry the same data. In this embodiment, the data on the first half of the pulse, $T_d^1$, is at one power level (e.g., the high level) while the same data is replicated on the second half of the pulse, $T_d^2$, at a different power level (e.g., the low level). This dual-level pulse technique may also be used to accommodate communication links within the network 100 architecture that have different node 108 distances. The pulse durations $T_d^1$ and $T_d^2$ and the period $T_p$ can be selected so that the total radiation exposure is below a level that would present an unacceptable hazard to humans.

The acquisition and recovery mode (Mode 3) is completed when both nodes 108(a), 108(b) reestablish optical communication. In one embodiment, node 108(b) sends a "ping" to node 108(a) and expects an "echo" back. If node 108(a) returns this "echo" through communication beam 110(a), node 108(b) knows it has made a connection and that both communication beams 310(a), 310(b) are not blocked. Alternatively, transmitter 304(a) sends a "ping" to receiver 306(b). If receiver 306(b) receives the "ping," control module 310(b) sends an "echo" through transmitter 304(b) back to node 108(a).

At this point, the control modules 310(a), 310(b) of each node 108(a), 108(b) terminate Mode 3 and begin the normal operating mode (Mode 1) as discussed above. As obvious to one skilled in the art, the control sequence is not limited by the order of the modes discussed above. For example, the modes disclosed could be repeated in various orders without disturbing the scope.

Figure 6:
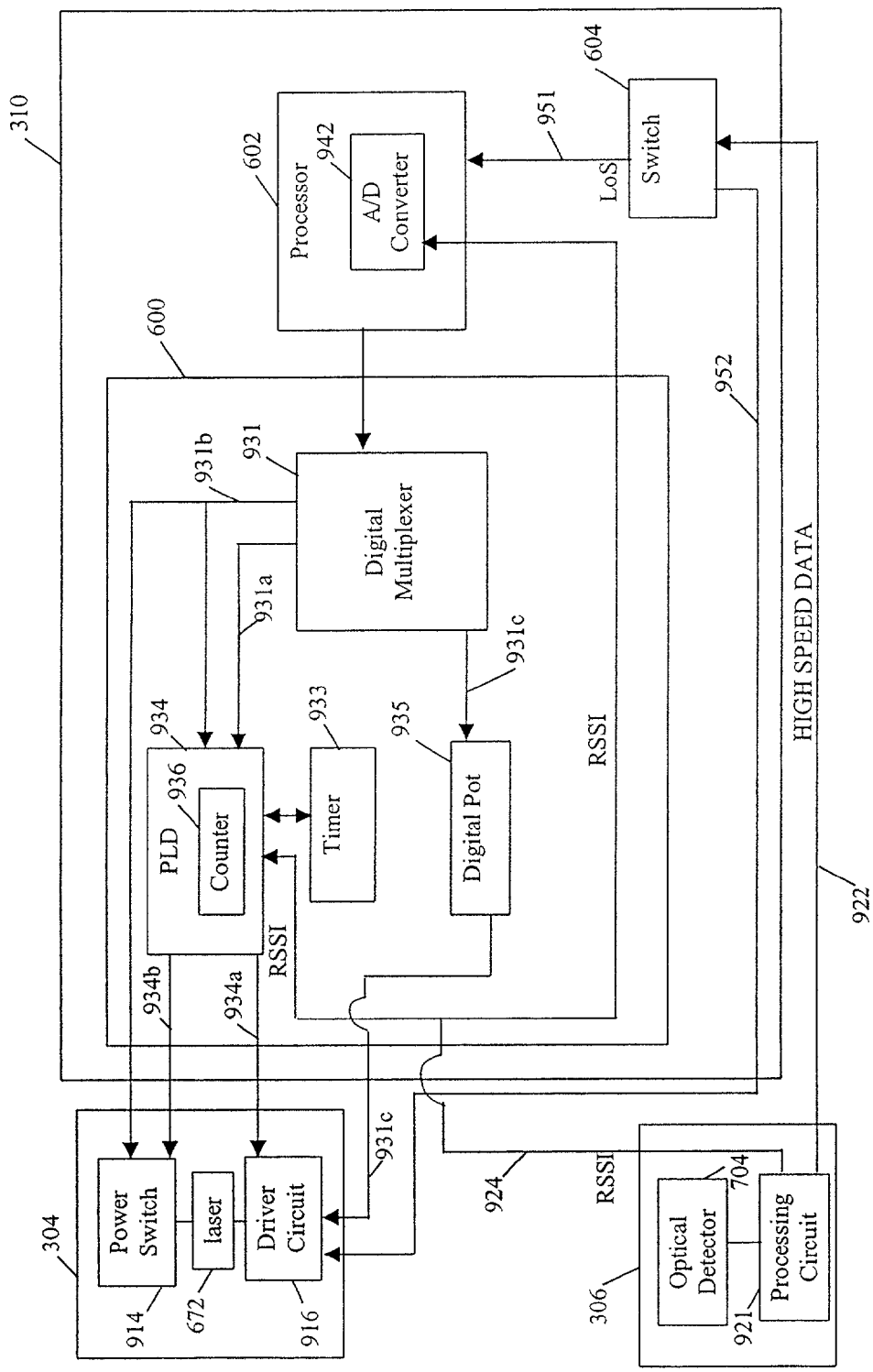
FIG. 6 is a block diagram of a control module from FIG. 3.

FIG. 6 is a block diagram of a control module 310(a) and/or 310(b) coupled to its associated transmitter 304 and receiver 306 from FIG. 3. The control module 310 includes a turret control module 600, a processor 602, and a switch 604.

The transmitter 304 includes a power supply switch 914, a driver circuit 916, and a laser 672. The power supply switch 914 drives power through laser 672. In one embodiment, the power switch 914 is a field effect transistor (FET). The driver circuit 916 controls the output power and data modulation of the laser 672 and can be independently controlled. Hence, in an event of blocking by an object, the output power of the laser 672 is independently controlled from the power switch 914 and/or the driver circuit 916.

The receiver 306 includes processing circuit elements 921 and an optical detector 704. The beam of a communication link that is transmitted by the laser 672 is focused onto the optical detector 704. In one embodiment, the optical detector 704 is a high-speed optical detector such as, for example, a PIN photodiode detector or avalanche photodiode detector (APD). The optical detector 704 is coupled to the processing circuit elements 921. The processing circuit elements 921 generate two different output signals 922 and 924 from the input signal received from the optical detector 704. The first signal 922 is the high-speed data extracted from the received beam of radiation and sent to the switch 604.

In one embodiment, the switch 604 is an ATM switch. ATM switches are generally well known in the art. Generally speaking, the ATM switch detects an arriving cell, aligns boundaries of cells arriving on multiple input lines, inspects the virtual path identifiers to determine the routing for a cell, converts the serial stream into a word parallel format, and time multiplexes the words onto time slots on a shared bus. A routing controller provides routing translation instructions to routing tables or accepts arriving virtual path identifiers from line interfaces to provide the correct routing instruction. A plurality of routing elements can be provided for each output. The routing element inspects the routing instruction associated with each word appearing on the shared bus, and delivers to its corresponding output cue only those cell segments intended for that output. In the ATM embodiment, each output cue reassembles the arriving word into ATM cells and delivers each ATM cell to the corresponding output port in serial format.

The second signal 924 is a received signal strength indicator (RSSI) which indicates whether an incoming beam of radiation is blocked by an object. The RSSI signal 924 is forwarded to the turret control module 600. In one embodiment, the RSSI signal 924 is in analog form.

One embodiment of the turret control module 600 includes a programmable logic device (PLD) 934, a digital multiplexer 931, a timer 933, and a digital pot 935. The PLD 934 provides local control intelligence for the turret control module 600 and includes a counter 936. The RSSI signal 924 sent by the receiver 306 is received by the PLD 934 and an analog to digital ("A/D") converter 942. When the RSSI signal 924 indicates a blocking has occurred at time $T_b$ (see FIG. 4), the PLD 934 initiates Mode 2 operation after the delay time T to reduce or turn of the power to the laser 672 in the transmitter 304. The delay time T in Mode 1, as illustrated in FIG. 4, is controlled by a timing signal from the timer 933. Thus, once the RSSI signal 924 is lost, the counter 936 within the PLD 934 begins counting down the time. Once the counter 936 counts to the end of the delay T, a signal 934a is sent to turn off the laser 672 or reduce its power via the driver circuit 916. The resulting power level of the laser 672 is selected to limit the exposure of the object to the beam of radiation. In one embodiment, the PLD 934 generates a second signal 934b that is coupled to the power switch 914 to turn off the laser 672 or reduce its power, providing a single level of redundancy.

Still referring to FIG. 6, the processor 602 includes the A/D converter 942 which also receives the RSSI signal 924. The processor 602 controls the operations of the modules described above and is programmed with software (not shown) to perform the power control sequence illustrated in FIG. 4. The turret control module 600 interfaces with and receives commands from the processor 602 via the digital multiplexer 931. In response to commands from the processor 602, the digital multiplexer 931 generates control signals 931a, 931b, 931c. Signal 931a is sent to the PLD 934 to reset the counter 936. The signal 931a is toggled periodically, for example, every 500 msec or less, to continually reset the counter 936 within the PLD 934. By continually resetting the counter 936, the PLD signal 934a is maintained at a value that keeps the laser 672 at a desired power level during the acquisition and recovery mode (Mode 3). During Modes 1 and 2, the signal 931a is not generated. In one embodiment, the signal 931a is left on during Modes 1 and 2 to allow continuous power to the laser 672.

The second control signal generated by the digital multiplexer 931 is signal 931b. Signal 931b controls both the PLD 934 and the power switch 914 in the transmitter 306. For example, if the processor 602 receives the RSSI signal 924, via the A/D converter 942, and determines that the beam of radiation is blocked by an object, signal 931b is set to a value that either turns off the power switch 914 or controls the power switch 914 so that the power of the laser 672 is reduced to a safe level. The signal 931b is also fed to the PLD 934 instructing the PLD 934 to set the value of the signal 934a to turn off or reduce the power of the laser 672 via the driver circuit 916. In another embodiment, the PLD 934 also sends signal 934b to control the power switch 914. Besides receiving the RSSI signal 924, the processor 602 is also notified that a block has occurred through a "loss of data" signal 951. The "loss of data" signal 951 is generated by the switch 604 when the high speed data signal 922 is lost.

The third control signal generated by the digital multiplexer 931 is signal 931c. Signal 931c controls the digital pot 935. In response to signal 931c, the digital pot 935 controls the modulation power level of the driver circuit 916 of the transmitter 304.

Table A shows one example of the logic status of different signals in the control module 310 for the control sequence described above.

TABLE A

| Control Mode | Signal 931a | Signal 934a | Signal 931b | Signal 951 | RSSI Signal 924 | Laser 672 |
|---|---|---|---|---|---|---|
| Laser is commanded off | X | Low (Off) | Low | X | X | Off |
| Acquisition/ Recovery (Mode 3) | Running | High (On) | Mode 3 Waveform | X | X | On (Mode 3 Waveform) |
| Normal (Mode 1) | Off | High (On) | High | Low (Data) | High | On |
| Power Reduction (Mode 2) | Off | Low (Off) | Low | High (no data) | Low | Off or at a safe low power after delay T |

X= Do not car

METHOD OF OPERATION

Figure 7:
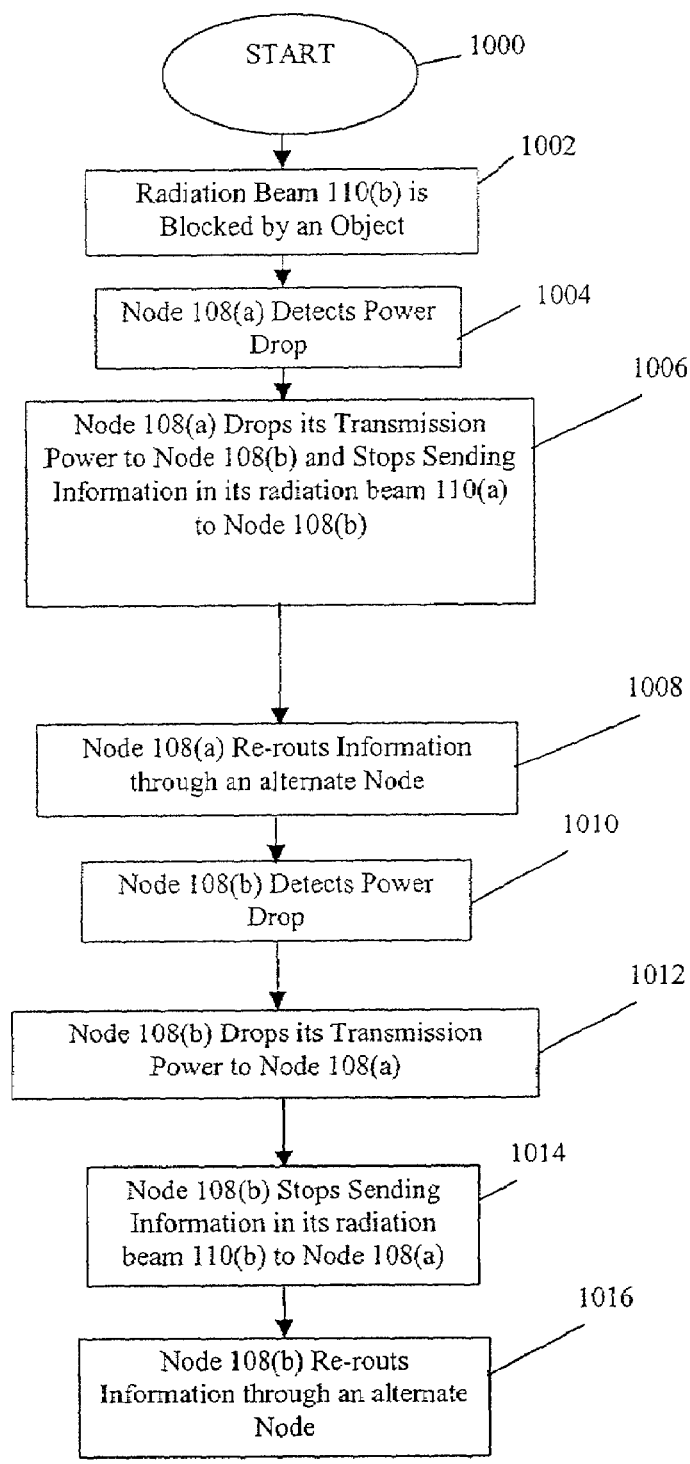
FIG. 7 is a flow chart illustrating a power reduction process performed by the control module.
Figure 8:
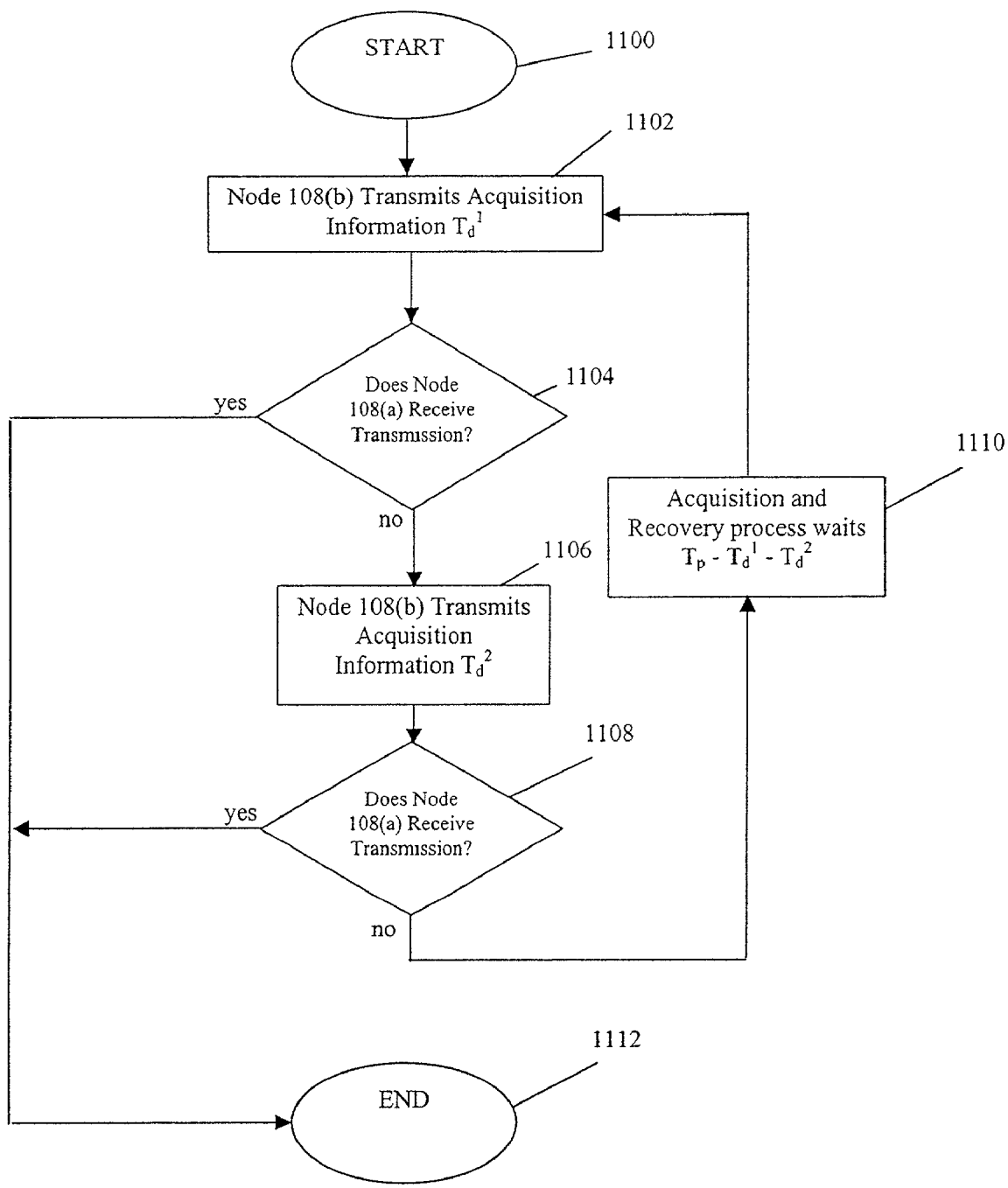
FIG. 8 is a flow chart of an acquisition and recovery process performed by the control module.

Operation of a communication network 100 in accordance with one embodiment is described below with reference to FIGS. 7 and 8 along with reference to FIG. 3. For convenience of description, the following text describes the communication network 100 where a single communication beam 110(b) has been blocked by an object 312. However, the following method can be used when both communication beams 110(a), 110(b) between nodes 108(a), 108(b) are blocked.

The process begins at a start state 1000. Next, at a state 1002, an object 312 blocks the communication beam 110(b). This may occur due to weather or an object, for example, a human or flying bird, entering the communication beam 110(b). Continuing to a state 1004, the control module 310(a), through receiver 306(a), detects a power drop in the communication beam 110(b) from a transmitter 304(b). Next, at a state 1006, in response to the drop in power, the control module 310(a) drops the power in a communication beam 110(a) sent by a transmitter 304(a) and stops sending data through transmitter 304(a) to node 108(b). Flow proceeds to state 1008 where the control module 310(a) reroutes the data that was earmarked for receiver 306(b) through an alternate node (not shown). Next, at a state 1010, the control module 310(b), through receiver 306(b), detects a power drop in the communication beam 110(a) from transmitter 304(a). Flow continues to a state 1012 where, in response to the drop in power, the control module 310(b) drops the transmission power of its communication beam 110(b) being sent by the transmitter 304(b) to node 108(a). Next, at a state 1014, the control module 310(b) stops sending data through transmitter 304(b) to receiver 302(a). Flow moves to state 1016 where the control module 310(b)

re-routes the data that was earmarked for receiver 306(a) through an alternate node (not shown).

The acquisition and recovery process (Mode 3) performed by the free-space optical communication system 100 will now be described with reference to FIG. 8. For convenience of description, the following text describes a free-space optical communication system 100 where a single communication beam 110(b) is recovered. However, the acquisition and recovery process can also be used when both communication beams 110(a), 110(b) need to be recovered.

The free-space optical communication system 100 begins at a start state 1100. Next, at a state 1102, a control module 310(b) transmits the acquisition information during $T_d^1$ through transmitter 304(b). Flow proceeds to a decision state 1104 to determine if a receiver 306(a) of node 108(a) receives the transmission. In one embodiment, the control module 310(b) sends a "ping" through transmitter 304(b) along communication beam 110(b) and expects an "echo" back. If the "echo" is received by receiver 306(b) along communication beam 110(a), the control module 310(b) knows it has made a connection. The free-space optical communication system 100 then proceeds to an end state 1112 where the process terminates. Once Mode 3 terminates, Mode 1 is initiated. Referring again to decision state 1104, if the receiver 306(b) does not receive the "echo" transmission, the free-space optical communication system 100 continues to a state 1106 where transmitter 304(b) transmits the acquisition information during $T_d^2$. Flow moves to decision state 1108 to determine if the receiver receiving node received the information during $T_d^2$. If the receiving node receives the transmission, the free-space optical communication system 100 continues to the end state 1112. Referring again to decision state 1108, if receiver 304(a) does not receive the transmission, the free-space optical communication system 100 continues to a state 1110 where the acquisition and recovery process waits for the duration of $T_p - T_d^1 - T_d^2$. Flow then proceeds to state 1102 as described above to repeat the transmissions.

While the above detailed description has shown, described, and pointed out novel features as applied to various embodiments, it will be understood that various omissions, substitutions, and changes in the form and details of the device or process illustrated may be made by those skilled in the art without departing from the spirit. The scope is indicated by the appended claims rather than by the foregoing description. All changes which come within the meaning and range of equivalency of the claims are to be embraced within their scope.

What is claimed is:

1. A method for controlling laser power in a communication system, the method comprising:
maintaining power of a first beam transmitted by a first node to a second node at a first level when the power of a second beam transmitted by the second node and received by the first node is above a minimum value;
reducing the power of the first beam to a second level when power from the second beam falls below the minimum value;
pulsing the power of the first beam;
transmitting information during the pulsing of the first beam to reestablish communication with the second node; and
increasing the power of the first beam to the first level;
wherein the pulsing power of the first beam includes a first high power level during a first portion of the pulsing and a second high power level during a second portion of the pulsing.

2. The method of claim 1, further comprising;
reducing the power of the second beam to the second level when power of the first beam received at the second node is reduced below the minimum value to limit an object's radiation exposure to a safe level when the object blocks the second beam.

3. The method of claim 2, further comprising:
pulsing the power of the second beam to limit the radiation exposure of the blocking object to the safe level;
transmitting information during the pulsing of the second beam to reestablish communication with the first node; and
increasing the power of the second beam.

4. The method of claim 1, further comprising the first and second beams maintaining a safe exposure level to a blocking object.

5. The method of claim 1, wherein the first portion and the second portion have an equal duration.

6. The method of claim 1, wherein transmitting information during the pulsing of the first beam is performed during the first portion and the second portion.

7. The method of claim 1, wherein transmitting information includes orientation information.

8. The method of claim 1, wherein the transmitting information includes node identification.

9. The method of claim 1, wherein the transmitting information includes node position.

10. The method of claim 1, wherein the transmitting information includes acquisition information and other information.

11. The method of claim 10, wherein the acquisition information and the other information is transmitted during different pulses.

12. The method of claim 1, wherein the minimum value is selected based on a predetermined signal to noise ratio for the first beam at the second node.

13. The method of claim 1, wherein the minimum value is harmful to humans.

14. The method of claim 1, wherein pulsing the power of the first beam provides an adequate signal to noise ratio to communicate with the second node.

15. A system configured for controlling laser power in a communication system, the system comprising:
a first node having a first transceiver configured to transmit a first beam and receive a second beam;
a second node having a second transceiver configured to transmit the second beam to the first transceiver and receive the first beam transmitted by the first transceiver;
a first control module configured to:
maintain power of the first beam at a first level when the power of the received second beam is above a minimum value;
reduce the power of the first beam to a second level when power from the second beam falls below the minimum value; and
pulse the power of the first beam;
wherein the first control module includes a processor configured to:
transmit information during the pulsing of the first beam to reestablish communication with the second node; and
increase the power of the first beam to the first level;
wherein the pulsing power of the first beam includes a first high power level during a first portion of the pulsing and a second high power level during a second portion of the pulsing.

16. The system of claim 15, wherein the first transceiver includes a receiver and a transmitter.

17. The system of claim 16, wherein the receiver includes an optical detector configured to detect the second beam.

18. The system of claim 17, wherein the receiver includes a processing circuit element coupled to the receiver and configured to extract a data signal and a received signal strength indicator from the second beam.

19. The system of claim 16, wherein the transmitter includes a laser configured to emit the first beam and a power switch coupled to both the laser and the first control module to change the first beam power.

20. The system of claim 16, wherein the transmitter includes a laser configured to emit the first beam and a driver circuit coupled to both the laser and the first control module to change the first beam power.

21. The system if claim 15, wherein the second transceiver includes a receiver and a transmitter.

22. The system of claim 15, further comprising communication electronics configured to couple the first control module to the first transceiver.

23. The system of claim 15, further comprising communication electronics configured to couple the second control module to the second transceiver.

24. The system of claim 15, wherein the processor is configured to change the first power level between multiple modes.

25. The system of claim 24, wherein the first control module is configured to change the duration of the power level within the multiple modes.

26. The system of claim 24, wherein the multiple modes includes radiation levels harmful to humans.

27. The system of claim 24, wherein the processor comprises a programmable logic device, a microprocessor, or a microcontroller.

28. The system of claim 24, wherein the processor receives multiple signals from the transceiver.

29. The system of claim 28, wherein the multiple signals include a data signal and a received signal strength indicator signal.

30. The system of claim 29, wherein the received signal strength indicator indicates to the processor that the second beam of radiation is blocked.

31. The system of claim 29, wherein the received signal strength indicator indicates to the processor that the first beam of radiation is blocked.

32. The system of claim 15, wherein the processor changes the first power level to a normal operation mode.

33. The system of claim 15, wherein the processor changes the first power level to a power reduction mode.

34. The system of claim 15, wherein the first and second beams maintain a safe exposure level to a blocking object.

35. A method for use in a system having a plurality of communication nodes, nodes having at least one optical transceiver configured to transmit and receive communication beams, the method comprising:
   transmitting a first communication beam from a first transceiver to a second transceiver at a first power level;
   transmitting a second communication beam from a second transceiver to the first transceiver;
   detecting at the first transceiver an object blocking the first communication beam; and
   reducing the power level of the first communication beam in response to detecting the object blocking the first communication beam; and
   pulsing the power of the first communication beam;
   transmitting information during the pulsing of the first beam to reestablish communication with the second node; and
   increasing the power of the first beam to the first level;
   wherein the pulsing power of the first communication beam includes a first high power level during a first portion of the pulsing and a second high power level during a second portion of the pulsing.

36. The method of claim 35, wherein detecting at the first transceiver is based on a power level change of the second communication beam.

37. The method of claim 36, wherein the power level change is measured based on a predetermined signal to noise ratio.

38. The method of claim 35, wherein detecting at the first transceiver is based on the duration of the interruption of the second communication beam.

39. The method of claim 35, wherein detecting at the first transceiver is based on an error rate associated with data transmitted by the second communication beam.

40. The method of claim 35, further comprising:
   detecting at the second transceiver the object blocking the first communication beam; and
   reducing the power level of the second communication beam in response to detecting the power level change in the first communication beam.

41. The method of claim 35, further comprising:
   transmitting information during the pulsing of the first communication beam to reestablish communication with the second optical transceiver; and
   increasing the power level of the first communication beam.

42. The method of claim 41, wherein the transmitting information includes acquisition information.

43. The method of claim 41, wherein pulsing the power of the first communication beam provides an adequate signal to noise ratio to communicate with the second transceiver.

* * * * *